United States Patent Office 2,732,406
Patented Jan. 24, 1956

2,732,406
NEW ASYMMETRIC DIPHENYLOL METHANES

Arthur Lambert, Blackley, Manchester, England, assignor to Imperial Chemical Industries Limited, a corporation of Great Britain No Drawing. Application March 2, 1953,
Serial No. 339,931

Claims priority, application Great Britain March 11, 1952

12 Claims. (Cl. 260—619)

This invention relates to new chemical compounds, namely 2:2'-dihydroxy-5:5'-dimethyldiphenylmethanes to the 3 position of which there is attached the tertiary carbon atom of a tertiary alkyl group of 4–8 carbon atoms and to the 3' position a cyclohexyl, bornyl, isobornyl or non-tertiary alkyl group of 1–5 carbon atoms.

The invention also relates to the manufacture of these new compounds.

We have found that these compounds are both valuable antiagers for those oils, fats and waxes which tend to deteriorate in the presence of oxygen and valuable intermediates for the manufacture of other compounds including other antiagers, e. g. metal salts of the same new compounds.

The new compounds may be made by interacting equimolecular proportions of two substituted cresols, one from one each of the two types of the general formulae

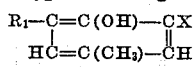

and

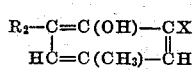

in which $R_1$ stands for a tertiary alkyl group of 4–8 carbon atoms, attached at a tertiary carbon atom, $R_2$ stands for cyclohexyl, bornyl, isobornyl or non-tertiary alkyl groups of 1–5 carbon atoms, and X stands for H or for either a —CH$_2$OH or a —CH$_2$Cl group, subject to the condition that one and only one of the two cresols which are interacted carries either a —CH$_2$OH group or a —CH$_2$Cl group.

More particularly the new compounds may be made by combining one molecular proportion of a substituted cresol from one of the two types of the general formulae

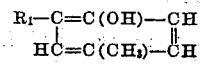

and

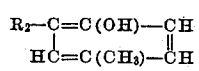

in which $R_1$ and $R_2$ stand for the same as above, with one molecular proportion of formaldehyde in the presence of a basic catalyst and then interacting the resulting product with one molecular proportion of a substituted cresol from the other type.

Alternatively one molecular proportion of the one cresol may be interacted with one molecular proportion of formaldehyde in the presence of anhydrous hydrogen chloride and the resulting chloromethyl derivative then interacted with one molecular proportion of the other cresol.

The following examples in which parts are by weight illustrate but do not limit the invention.

Example 1

A mixture of 31.7 parts of 2:4-dimethylphenol and 22.2 parts of 35% formaldehyde was vigorously stirred with a paste made from 9 parts of calcium hydroxide and 7 parts of water. The temperature was not allowed to rise above 35° C. and the reaction was complete in approximately 30 minutes. The product was acidified with dilute acetic acid and extracted with ether. After drying over sodium sulphate the ether was removed and the residue crystallised from light petroleum (B. P. 40–60° C.) giving 2-hydroxy-3:5-dimethylbenzyl alcohol, M. P. 53–54° C.

18 parts of 2-hydroxy-3:5-dimethylbenzyl alcohol and 25 parts of 2-tert-butyl-4-methylphenol were mixed and heated at 90° C. until molten. The mixture was cooled to 30° C. and treated with 5.9 parts of concentrated hydrochloric acid, S. G. (1.18), with shaking. When the initial reaction had subsided the mixture was heated at 100° C. for one hour. It was then extracted with benzene, washed free from acid with water and distilled. After removal of the benzene, 2:2'-dihydroxy-3-tert-butyl-3':5:5-trimethyldiphenylmethane was collected as a colourless resin, B. P. 172–194° C./0.1 mm. which was crystallised from light petroleum (B. P. 40–60° C.) M. P. 83–84° C.

Example 2

2-tert-butyl-4-methylphenol (35 parts) was dissolved in petroleum ether (B. P. 60–80° C., 40 parts) and 2-hydroxy-5:5-dimethylbenzyl chloride (36 parts) was added. After keeping at room temperature overnight, the product was washed with water, dried over sodium sulphate and distilled. The fraction, B. P. 182–186° C./0.03 mm. was recrystallised from petrol to give 2:2'-dihydroxy - 3-tert-butyl-3':5:5'-trimethyldiphenylmethane. The corresponding 3-tert-amyl derivative may be obtained in a similar way.

Example 3

2-(1:1:3:3-tetramethylbutyl)-4-methylphenol (42 parts) and 2 - hydroxy-3:5-dimethylbenzyl alcohol (29 parts) were dissolved in petroleum ether (50 parts) and stirred at 60° C. for 3 hours with concentrated hydrochloric acid (½ part). The resultant solution was taken up in ether, washed with water, dried over magnesium sulphate, and distilled. After removal of the ether, 2:2'-dihydroxy - 3-(1:1:3:3-tetramethylbutyl)-3':5:5'-trimethyldiphenylmethane was collected as a glassy resin, B. P. 170–184° C./0.1 mm.

Example 4

2-tert-butyl-4-methylphenol (41 parts) was suspended in a solution of sodium hydroxide (14 parts) in water (20 parts). Formaldehyde (35% solution, 25 parts) was added and the mixture was stirred during the addition of sufficient methanol to effect solution. After setting aside overnight, the solution was poured into water. The precipitated oil was taken up in ether. The ether solution was washed with water and dried over magnesium sulphate. The solvent was then evaporated at room temperature under reduced pressure. The residue was a viscous syrup consisting of 2-hydroxy-3-tert-butyl-5-methylbenzyl alcohol. A solution of this product (30 parts) in benzene (25 parts) was treated with 2-cyclohexyl-4-methylphenol (30 parts) and concentrated hydrochloric acid (6 parts). The mixture was stirred at 50–60° C. for 2 hours and then overnight at room temperature. The aqueous layer was separated, benzene (20 parts) was added and the solution was washed with water, and distilled. 2:2'-dihydroxy-3-tert-butyl-3'-cyclohexyl-5:5'-dimethyldiphenylmethane was collected at B. P. 210–222° C./0.4 mm. as a hard, pale yellow resin.

Example 5

2-sec-butyl-4-methylphenol (42 parts) was suspended in a solution of sodium hydroxide (20%, 60 parts) and mixed with formaldehyde (35% solution, 25 parts). Sufficient methanol was added to give a clear solution, which was set aside for 60 hours. Water was then added and the resultant oil suspension was neutralised with acetic acid and extracted with ether. The ether solution was dried and evaporated at room temperature to give 2-hydroxy-3-sec-butyl-5-methylbenzyl alcohol as a syrupy liquid. A solution of this product (40 parts) in ether (100 parts) was stirred overnight at 0° C. with concentrated hydrochloric acid (250 parts). The product was diluted with ether, washed with water and dried over sodium sulphate. After filtering off the drying agent 2-tert-butyl-4-methylphenol (31 parts) was added to the filtrate and the solution set aside overnight. It was then washed with water, dried over sodium sulphate, the ether evaporated, and the residue distilled. 2:2'-dihydroxy-3-tert-butyl-3'-sec-butyl-5:5'-dimethyldiphenylmethane was collected at 178–180° C./0.02 mm.

*Example 6*

2 - hydroxy - 3 - tert-butyl - 5-methylbenzylalcohol (29 parts) prepared as described in Example 4 was mixed with 2-isobornyl-4-methylphenol (34 parts). Concentrated hydrochloric acid (4 parts) were added and the mixture was stirred at 100° C. for 4 hours. The product was taken up in ether and the solution was washed with water, dried over sodium sulphate and distilled. 2:2'-dihydroxy - 3 - tert - butyl - 3' - isobornyl-5:5'-dimethyldiphenylmethane, was collected at B. P. 176–220° C./0.05 mm.

What I claim is:

1. New chemical compounds, namely 2:2'-dihydroxy-5:5'-dimethyldiphenylmethanes to the 3 position of which there is attached the tertiary carbon atom of a tertiary alkyl group of 4–8 carbon atoms and to the 3' position a radical of the group consisting of cyclohexyl, bornyl, isobornyl and methyl radicals.

2. New chemical compounds, namely, 2:2'-dihydroxy-5:5'-dimethyldiphenylmethanes to the 3 position of which there is attached the tertiary carbon atom of a tertiary alkyl group of 4–8 carbon atoms and to the 3' position a methyl group.

3. Process for the manufacture of the new compounds claimed in claim 1, which comprises interacting equimolecular proportions of two substituted cresols, one from one each of the two types of the general formulae

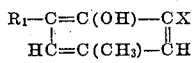

and

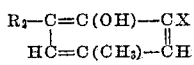

in which $R_1$ stands for a tertiary alkyl group of 4–8 carbon atoms, attached at a tertiary carbon atom, $R_2$ stands for a radical of the group consisting of cyclohexyl, bornyl, isobornyl and methyl radicals, and X stands for a member of the group consisting of —H, —CH$_2$OH, and —CH$_2$Cl substituents, subject to the condition that in one and only one of said cresols, X is hydrogen.

4. Process for the manufacture of the new compounds claimed in claim 1, which comprises combining one molecular proportion of a substituted cresol from one of the two types of the general formulae

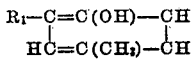

and $$R_2-C=C(OH)-CH$$
$$H\overset{|}{C}=C(CH_3)-\overset{\|}{C}H$$

in which $R_1$ stands for a tertiary alkyl group of 4–8 carbon atoms attached at a tertiary carbon atom, and $R_2$ stands for a radical of the group consisting of cyclohexyl, bornyl, isobornyl and methyl radicals, with one molecular proportion of formaldehyde in the presence of a basic catalyst and then interacting the resulting product with one molecular proportion of a substituted cresol from the other type.

5. Process for the manufacture of the new compounds claimed in claim 1, which comprises interacting one molecular proportion of a substituted cresol from one of the two types of the general formulae

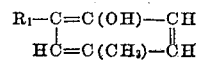

and

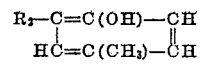

in which $R_1$ stands for a tertiary alkyl group of 4–8 carbon atoms attached at a tertiary carbon atom, and $R_2$ stands for a radical of the group consisting of cyclohexyl, bornyl, isobornyl and methyl radicals, with one molecular proportion of formaldehyde in the presence of anhydrous hydrogen chloride and then interacting the resulting chloromethyl derivative with one molecular proportion of the other cresol.

6. Process for the manufacture of the new compounds claimed in claim 2, which comprises interacting equimolecular proportions of 2:4-dimethylphenol and a 2-hydroxy-3-tert-alkyl-5-methylbenzyl chloride in which the tertiary alkyl group has 4–8 carbon atoms and is attached at a tertiary carbon atom.

7. Process for the manufacture of the new compounds claimed in claim 2 which comprises interacting equimolecular proportions of 2-hydroxy-3:5-dimethylbenzyl alcohol and a 2-tert-alkyl-4-methylphenol in which the tertiary alkyl group has 4–8 carbon atoms and is attached at a tertiary carbon atom.

8. 2:2' - dihydroxy - 3 - tert - butyl - 3':5:5' - trimethyldiphenylmethane.

9. 2:2' - dihydroxy - 3 - tert - butyl - 3' - isobornyl-5:5'-dimethyldiphenylmethane.

10. 2:2' - dihydroxy - 3 - tert - butyl - 3'-cyclohexyl-5:5'-dimethyldiphenylmethane.

11. 2:2' -dihydroxy - 3 - (1:1:3:3 - tetramethylbutyl)-3':5:5'-trimethyldiphenylmethane.

12. 2:2' - dihydroxy - 3 - tert - amyl - 3' - 5:5' - trimethyldiphenylmethane.

References Cited in the file of this patent

UNITED STATES PATENTS

| | | |
|---|---|---|
| 2,440,909 | Niederl | May 4, 1948 |
| 2,488,134 | Mikeska et al. | Nov. 15, 1949 |
| 2,570,402 | Stevens et al. | Oct. 9, 1951 |

OTHER REFERENCES

Morgan et al.: Jour. Soc. Chem. Industry, vol. 52, pgs. 418T–420T (Dec. 8, 1933, 3 pgs.).

Harden et al.: Jour. Amer. Chem. Soc., vol. 59, pgs. 2379–80 (Nov. 1937, 2 pgs.).